C. S. WOOD.
VULCANIZING DEVICE FOR TIRE CASINGS.
APPLICATION FILED APR. 3, 1916.
1,207,117.
Patented Dec. 5, 1916.
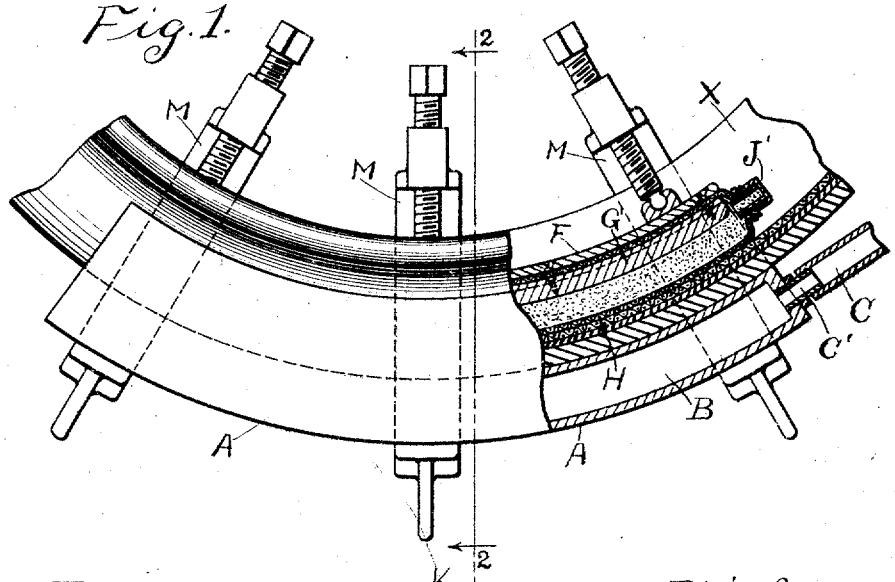
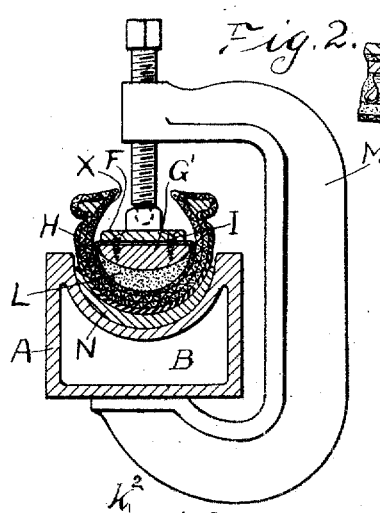
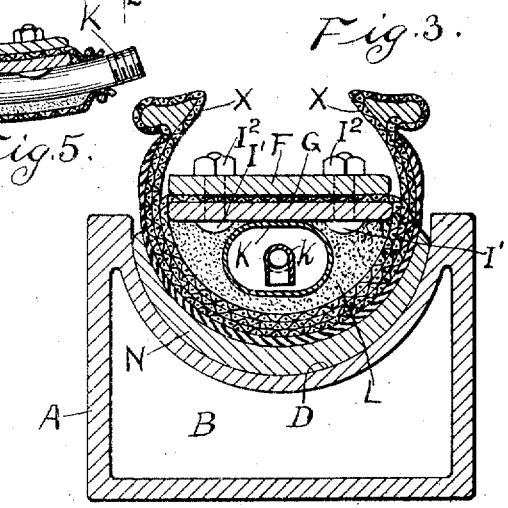
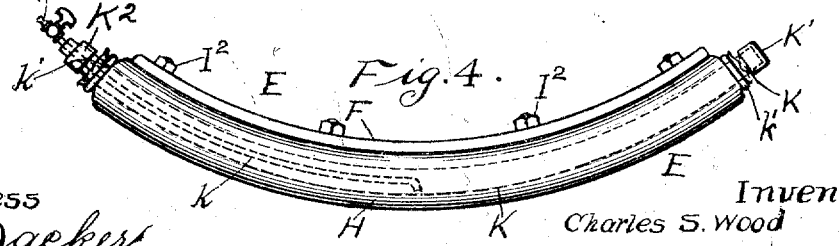
Witness
E. D. Jaekers
Inventor:
Charles S. Wood
By Charles Turner Brown,
Att'y.

UNITED STATES PATENT OFFICE.

CHARLES S. WOOD, OF CHICAGO, ILLINOIS.

VULCANIZING DEVICE FOR TIRE-CASINGS.

1,207,117.   Specification of Letters Patent.   Patented Dec. 5, 1916.

Application filed April 3, 1916. Serial No. 88,647.

*To all whom it may concern:*

Be it known that I, CHARLES S. WOOD, M. D., a citizen of the United States, residing in Chicago, in the county of Cook and State of Illinois, have invented certain new and useful Improvements in Vulcanizing Devices for Tire-Casings, of which the following, when taken in connection with the drawing accompanying and forming a part hereof, is a full and complete description sufficient to enable those skilled in the art to which it pertains to understand, make, and use same.

This invention relates to devices which are used in combination with hollow molds adapted to be heated, as by steam, in retreading automobile casings, in making sectional repairs thereto and in vulcanizing additional material on to the side walls thereof.

To those skilled in the repair or recovering of automobile tire casings it is well known that a hollow mold, adapted to be heated by steam, constructed of a length suitable for the work sought to be done to the casing and provided with a recess or groove fitting approximately closely to the tread of the casing and with a face corresponding with the tread to be given the casing, applied to the face and side of the tread; the said casing is secured in the mold being backed up by a device usually termed a pad, which is placed within the casing, and having clamps to provide the requisite pressure. The inner face or surface of automobile casings is frequently somewhat uneven, having at times ridges or lumps thereon.

In pads used as above described where only the outside of the casing is to be operated on, the face of said pad which is opposed to the mold must correspond with the inner surface of the casing which is being repaired.

The principal objects of this invention are to obtain a device by means of which the use of shims and other devices for making the face of the pad correspond with the inner surface of the casing, which is being repaired, are not required, and by which heat may be applied to said inner surface at the same time it is applied to the outer surface of a casing.

A further object is to obtain a pad which may be used in combination with a mold for more than one size of casing.

A further object is to obtain a pad which is adapted to withstand, for a considerable time, the heat to which it is subjected when used in the vulcanizing of a casing; that is, to so withstand said heat as to be durable.

I have illustrated a device embodying this invention and a mold in combination with which the same is adapted to be used in the accompanying drawing, in which, Figure 1, is a side view, partly in elevation and partly in vertical section of a portion of an automobile casing, a mold and a device embodying a modification of this invention positioned in said casing. Fig. 2, is a vertical sectional view on line 2—2 of Fig. 1, viewed in the direction indicated by the arrows. Fig. 3, is a vertical section of a mold, a casing in said mold and another form of the device embodying this invention in said casing. Fig. 4, is a side elevation of the device embodying this invention, which is illustrated in Fig. 3, and Fig. 5, is a vertical section of the end of the device.

A reference letter applied to designate a given part, indicates said part throughout the several figures of the drawing, wherever the same appears.

X is an automobile casing.

A, is a hollow mold and B is a chamber in said mold, C a pipe, from a source of steam supply, which is attached to one end of the mold A by means of nipple $C^1$ (Fig. 1) in such manner as to discharge steam into chamber B.

Referring to Fig. 1, it is observable that the mold A is curved longitudinally, said curve corresponding with the circumferential curve of casing X; and referring to Figs. 2 and 3 it will be observed that the curve of the inner face, D, of the longitudinally extending groove in mold A, corresponds with the lateral curve of the outer face of casing X. The above described construction of the mold A is common in the art.

The construction of the device E embodying this invention is disclosed in Figs. 3, 4, and 5, and a modified construction of said device is illustrated in Figs. 1 and 2.

In the construction illustrated in Figs. 1 and 2, (as well as in Figs. 3, 4, and 5), F is the base of the device and is preferably made of a strip of metal curved longitudinally.

G, Figs. 3 and 4, and $G^1$, Fig. 2, is a sub-base of the device, and said sub-bases are, respectively, curved longitudinally. H is the outer casing of the device made by me of strong canvas. The side edges of the casing H are secured firmly in place between base F and sub-bases G, G¹, respectively, as by the screws I joining said base F and sub-base G¹ together in Figs. 1 and 2 and bolts I¹ with nuts I² thereon, in Figs. 3 and 4.

J, Fig. 1, is a nipple secured in one end of the casing H, and J¹ is a cap covering nipple J. K is a pipe which, in the preferred construction of the device, extends entirely through the casing H and to which the ends of said casing are secured as by wire or cord in the same manner as said ends are secured to the nipple J in the construction illustrated in Figs. 1 and 2. K¹ is a cap on one end of pipe K which is removed when a pipe from a source of steam supply is to be attached to the device. K² is a reducer which is attached to the discharge end of pipe K and $k$ is a drain pipe extending through reducer K² and to near midway of pipe K¹. The drain pipe $k$ is provided with a stop cock $k^2$ in the usual manner and when water collects in pipe K in the use of the device, it is discharged therefrom on the opening of said stop cock, through the drain pipe $k$. L represents a sand filling of chamber B of the device. The filling L is put into the casing through the nipple J in the construction illustrated in Fig. 1, after removing cap J¹. In the construction illustrated in Figs. 3, 4 and 5, said sand filling is put into said casing after the pipe K is inserted therein and before the ends of said casing are attached to said pipe as by wire or cord $k^1$. Chamber B being well filled with said material (preferably sand), the face of the device which comes in contact with the inner face of the automobile casing, when said device, casing and mold are assembled, as in Figs. 1, 2 and 3, is what I term yieldingly rigid. The yieldingly rigid character of said face of the device is comparable with that of casing X, when in position on the rim of a wheel with an inflated tube therein. The yielding function of the face of the device is to adapt it to use in more than one size of casing and further to cause said face to fit closely to any roughness, as a lump, ridge, or patch on the inner face of an automobile casing, while at the same time its rigidity is such that when the device, an automobile casing and a mold are assembled and forcibly brought together by clamps M, the tire casing X is held firmly to the mold A and casing H is held firmly to the inner face of casing X.

I have termed the construction illustrated in Figs. 1 and 2, a modification because in said construction the steam pipe K is omitted and a sub-base (G¹) of greater thickness than the sub-base G in the construction illustrated in Figs. 3, 4 and 5 has been substituted for said sub-base G.

N illustrates a rubber strip which is adapted to be vulcanized to an automobile tire casing to form a new tread thereon.

I claim:—

1. A pad for vulcanizing tire casings, comprising an external base adapted to resist pressure, means to apply pressure to said base, a flexible casing, and means to attach said casing to said base, in combination with a steam chamber and granular filling surrounding said chamber in said casing, said chamber provided with an aperture at its ends, and means to close said apertures, said base, steam chamber and casing curved longitudinally, and said casing curved laterally.

2. A pad for vulcanizing tire casings comprising a base curved longitudinally, a flexible casing, curved laterally, a sub-base, means to attach said sub-base to said base with the sides of said casing interposed between said base and sub-base, a steam chamber in said casing, and a granular filling between the walls of said steam chamber and said casing.

3. A pad for vulcanizing tire casings, consisting of a base and a casing made of fabric, in combination with a sub-base, means to attach said base and sub-base together with the casing interposed between them, a walled chamber in said casing, said chamber provided with an inlet, said casing adapted to form the laterally curved wall of an additional chamber, and a filling in said additional chamber, to embed said walled chamber therein.

CHARLES S. WOOD, M. D.

Witnesses:
CHARLES TURNER BROWN,
HELYN MULDOWNEY.